UNITED STATES PATENT OFFICE.

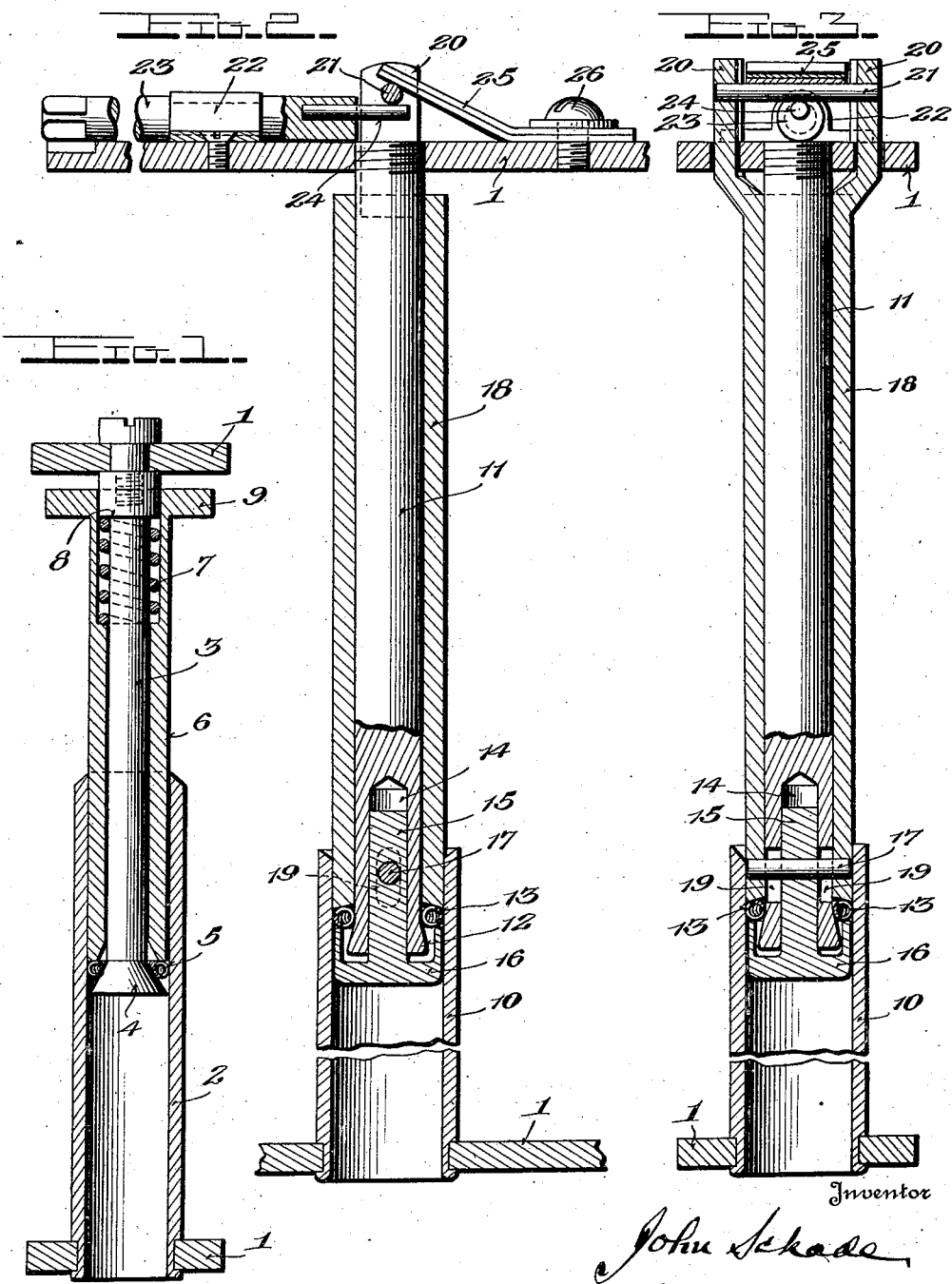

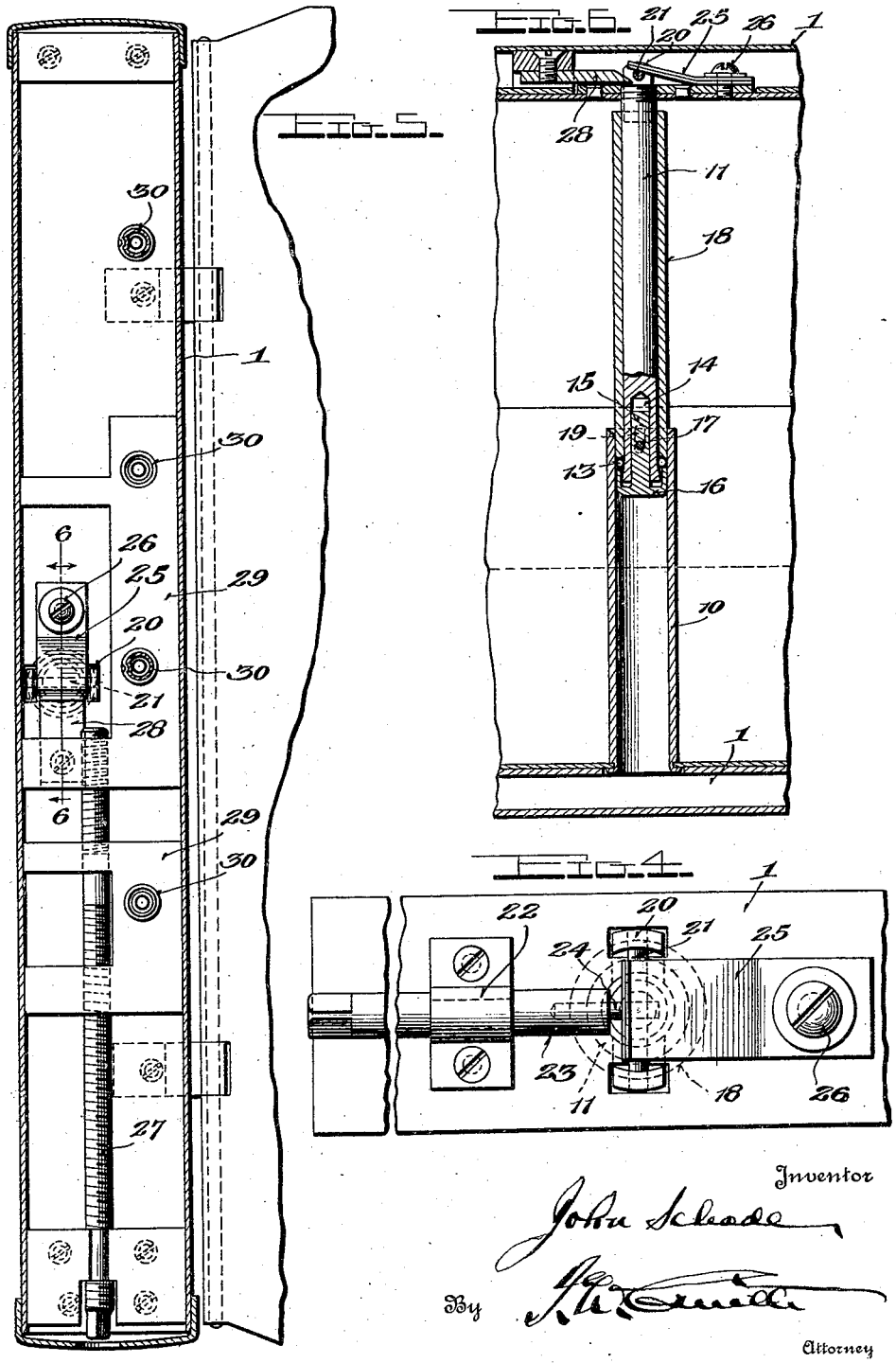

JOHN SCHADE, OF HOLYOKE, MASSACHUSETTS, ASSIGNOR TO NATIONAL BLANK BOOK COMPANY, OF HOLYOKE, MASSACHUSETTS, A VOLUNTARY TRUST ASSOCIATION OR COPARTNERSHIP, HAVING AS TRUSTEES, F. B. TOWNE, E. S. TOWNE, J. M. TOWNE, AND F. W. WILSON.

FRICTION CLUTCH FOR TELESCOPING ELEMENTS.

1,418,329.　　　　　　　Specification of Letters Patent.　　Patented June 6, 1922.

Application filed April 2, 1921. Serial No. 458,015.

*To all whom it may concern:*

Be it known that I, JOHN SCHADE, a citizen of the United States, residing at the city of Holyoke, county of Hampden, and State of Massachusetts, have invented certain new and useful Improvements in Friction Clutches for Telescoping Elements; and I do declare the following to be a full, clear, and exact description of the invention, such as will enable others skilled in the art to which it appertains to make and use the same.

This invention relates to certain new and useful improvements in a friction clutch for telescoping elements and it has for its primary object to provide an efficient and quickly releasable clutch capable of embodiment and use in loose leaf ledgers or other structures where it is desirable to securely lock together two elements for quick or ready release.

The invention consists broadly in a pair of telescopic members the male member of which embodies a conical-headed member, an expansible clutch ring movable thereover for expansion against the inner wall of the female member, and means for effecting movement of the ring over the conical head.

Further, the invention resides in the features of construction and the arrangements and combinations of parts hereinafter described and claimed, reference being made to the accompanying drawings wherein:

Figure 1 is a longitudinal section through one form of the invention, the conical-headed member being in elevation;

Figure 2 is a similar view through another form or embodiment of the invention, portions being in elevation;

Figure 3 is a similar view of the embodiment depicted in Figure 2 but taken at right angles from the point of view thereof;

Figure 4 is a top plan view of the construction illustrated in Figures 2 and 3;

Figure 5 is a sectional view through a loose leaf ledger of the bayonet slotted leaf type showing the embodiment of the present invention therein; and Figure 6 is a longitudinal section therethrough on line 6—6 of Figure 5.

Referring more in detail to the drawings, and referring more particularly to the form of the invention shown in Fig. 1, the numerals 1 designate a pair of separable members which it is desired to releasably lock or secure together and to one of which is fixed one end of a tabular female element or sleeve 2 and to the other is fixed the conical-headed stem or male element 3. The head 4 of this latter element flares outwardly and is encircled by an expansible collet or clutch ring 5 which is in the nature of an endless coiled spring and is adapted to move outwardly over the conical head 4 to expand into frictional engagement with the inner wall of the female element. A male sleeve 6 is slidable on the stem or shaft 3 to engage and move the ring to its operative position. The outer end of the operating sleeve 6 is counterbored to receive a spring 7 which is compressed therein by the shoulder or enlargement 8 on the stem 3 so as to normally urge the sleeve to its operative position. A lift or hold 9 is also formed on the operating sleeve by which it may be retracted against the action of the spring to render the clutch ring inoperative.

In the embodiment depicted in Figures 2, 3 and 4, the female element 10 is designed to receive the male element 11 which, like the element 3, is provided with a conical head 12 that is embraced by the expansible clutch ring 13. The head is axially bored to form a chamber 14 in which a shank 15 is slidable, said shank carrying on its outer end a cup shaped cap or head 16 which is designed to freely fit over the head 12 and engage the clutch ring to dislodge it from its operative position should it stick therein. The shank is rigidly connected by a pin 17 to the operating sleeve 18 to move therewith, diametral slots 19 being provided in the male element through which the pin passes. Therefore, the sleeve and cap move as a unit relative to the male element 11.

The opposite end of the operating sleeve is provided with a pair of ears 20 which slidably extend through openings in the adjacent member 1 and on opposite sides of the male element, and these ears are connected by a cross bearing pin 21. Rotatable in the bearing 22 on the member 1 is an operating shaft 23 being formed on its outer end to enter a key socket and carrying on its inner end an eccentrically arranged pin 24 designed to cam against the bearing pin 21 and effect retraction of the operating sleeve which is normally urged to its operative position by means of a leaf spring 25 that is anchored to the supporting member 1 by screw 26 and has its free end overlying and contacting with said bearing pin 21.

The cross pin thus forms more or less of a stirrup against the bottom of which the spring 25 bears constantly for urging the operating sleeve to its normal position so that the collet or ring will become operative. The members 1 in this form comprise the covers or backs of a loose leaf ledger and the shaft 23 functions also to work the right and left handed blocks which reside in the particular type of binder, so that when the shaft is turned in one direction the cam pin 24 will act against the pin 21 to retract the operating sleeve and when turned in the opposite direction the cam pin will return to normally inoperative position to permit the leaf spring to function.

The form of clutch depicted by Figures 2, 3 and 4 may also be embodied in the bayonet slot type of ledger as illustrated in Figures 5 and 6 wherein the ledger-operating screw 27 is utilized to slide a wedge 28 beneath the bearing pin 21 and exert a lifting influence thereon to retract the operating sleeve. This wedge member is secured to one of the blocks 29 that carries one of the movable binder posts which are drawn into the bayonet slots.

When the screw 27 is operated to draw the two movable posts 30 into the slots of the ledger as is more clearly described and claimed in a copending application, the wedge will be withdrawn from beneath the pin 21 and the male sleeve will thus be forced by the leaf spring to cause the firm locking of the clutch, and vice versa.

What is claimed is:

1. In a friction clutch, a pair of telescopic elements, the male element of which carries a conical head formed with an axial bore, an expansible clutch ring movable over the head into engagement with the female element, an operating sleeve slidable on the male element to engage at one end the ring for moving it outwardly over the head to operative position, a cap slidable over the head to engage the operative ring to release the same, said cap having a shank slidable in the bore of the head and connected through a slot in the latter to the sleeve whereby upon movement of the sleeve to inoperative position the cap will be moved to operative position, and means for sliding the sleeve.

2. In a friction clutch, a pair of telescopic elements, the male element of which carries a conical head, an expansible clutch ring movable over the head into engagement with the female element, an operating sleeve slidable on the male element to engage at one end the ring for moving it outwardly over the head to operative position, and a cap slidable over the head to engage the operative ring to release the same, means for moving the cap to and from operative position.

3. In a friction clutch, a pair of telescopic elements, the male element of which carries a conical head, an expansible clutch ring movable over the head into engagement with the female element, an operating sleeve slidable on the male element to engage at one end the ring for moving it outwardly over the head to operative position, a cap slidable over the head to engage the operative ring to release the same, a connection between the cap and sleeve for effecting movement of one upon moving the other, the opposite end of the sleeve being formed with a pair of spaced ears, a bearing pin connecting the same, a leaf spring bearing on the pin to urge the sleeve to one position, and means for engaging the pin to move the sleeve against the action of the spring.

4. In a friction clutch, a pair of telescopic elements, the male element of which carries a conical head, an expansible clutch ring movable over the head into engagement with the female element, an operating sleeve slidable on the male element to engage at one end the ring for moving it outwardly over the head to operative position, a cap slidable over the head to engage the operative ring to release the same, a connection between the cap and sleeve for effecting movement of one upon moving the other, the opposite end of the sleeve being formed with a pair of spaced ears, a bearing pin connecting the same, a leaf spring bearing on the pin to urge the sleeve to one position, a turnable operating member, and means movable by the latter for moving the sleeve against the action of the spring.

5. In a friction clutch, a pair of telescopic elements, the male element of which carries a conical head, an expansible clutch ring movable over the head into engagement with the female element, an operating sleeve slidable on the male element to engage at one end the ring for moving it outwardly over the head to operative position, a cap slidable over the head to engage the operative ring to release the same, a connection between the cap and sleeve for effecting movement of one upon moving the other, the opposite end of the sleeve being formed with a pair of spaced ears, a bearing pin connecting the same, a leaf spring bearing on the pin to urge the sleeve to one position, a turnable operating member, and a cam pin eccentrically carried on the end of the latter adjacent the bearing pin to engage the latter and effect movement of the sleeve against its spring.

6. In a friction clutch, a pair of telescopic elements, the male element of which carries a conical head, an expansible clutch ring movable over the head into engagement with the female element, an operating sleeve slidable on the male element to engage at one end the ring for moving it outwardly over the head to operative position, a cap slidable over the head to engage the operative ring to release the same, a connection between the cap and sleeve for effecting movement of one upon moving the other, the opposite end of the sleeve being formed with a pair of spaced ears, a bearing pin connecting the same, a leaf spring bearing on the pin to urge the sleeve to one position, a turnable operating member, and a wedge slidable by the latter beneath the bearing pin to move the sleeve against the action of its spring.

7. In a device of the class described, a pair of connectible members, a female element on one member, a male element on the other having a conical head, a clutch ring movable outwardly over the head into engagement with the female element, a sleeve slidable on the male element to actuate the ring, a bearing part provided on the outer end of the sleeve, and means engaging said part to operate the sleeve.

8. In a device of the class described, a pair of connectible members, a female element on one member, a male element on the other having a conical head, a clutch ring movable outwardly over the head into engagement with the female element, a sleeve slidable on the male element to actuate the ring, a bearing part provided on the outer end of the sleeve, a spring fixed to one member for urging the sleeve to one position and means mounted on said member to move the sleeve against the action of the spring.

9. In a device of the class described, a pair of connectible members, a female element on one member, a male element on the other having a conical head, a clutch ring movable outwardly over the head into engagement with the female element, and means for moving the ring outwardly and inwardly over the head.

10. In a friction clutch, telescopic elements, a tapered head on the male element, an expansible clutch ring on the latter adapted to be moved onto the head to expand the ring against the female element, a follower sleeve on the male element for moving the ring, and a spring means for moving the sleeve.

In testimony whereof I affix my signature hereto.

JOHN SCHADE.